United States Patent [19]

Turchan

[11] Patent Number: 4,761,270

[45] Date of Patent: Aug. 2, 1988

[54] METHOD OF REDUCING THE OXIDES OF NITROGEN IN FOSSIL FUELS COMBUSTION AND COMBUSTION EFFLUENTS USING HYDRAZINE AND/OR HYDRAZINE COMPOUNDS

[76] Inventor: Otto C. Turchan, 458 El Camino Dr., Beverly Hills, Calif. 90212

[21] Appl. No.: 14,821

[22] Filed: Feb. 13, 1987

[51] Int. Cl.$^4$ .............................................. C01B 21/00
[52] U.S. Cl. .................................................... 423/235
[58] Field of Search .................... 423/235, 235 D, 239, 423/239 A, 243

[56] References Cited

U.S. PATENT DOCUMENTS 1,834,016 12/1931 Bottoms ............................. 423/243
4,325,924 4/1982 Arand ................................. 423/235
4,517,165 5/1985 Moriarity ........................... 423/235

FOREIGN PATENT DOCUMENTS 52-35163 3/1977 Japan ................................... 423/235
53-43077 4/1978 Japan ................................... 423/235

Primary Examiner—Gregory A. Heller

[57] ABSTRACT

The subject invention relates to a method for reducing the concentration of NOx formed in fossil fuels combustion process to harmless $N_2$ discharged in the combustion effluents and process comprising the step of interjecting hydrazine and/or hydrazine compounds into the fuel combustion reaction zone mixture of a fossil fuel fired combustion apparatus or combustion device, to inhibit the mechanism of NO formation in the fuel combustion reaction zone and reduce formed NO present in the fuel combustion reaction zone mixture to $N_2$ in reaction with hydrazine and/or hydrazine compounds interjected into the fuel combustion reaction zone.

1 Claim, No Drawings

METHOD OF REDUCING THE OXIDES OF NITROGEN IN FOSSIL FUELS COMBUSTION AND COMBUSTION EFFLUENTS USING HYDRAZINE AND/OR HYDRAZINE COMPOUNDS

BACKGROUND OF THE INVENTION

My invention pertains to a method for reducing the concentration of oxides of nitrogen (NOx) formed in fossil fuels combustion and combustion effluents. In one aspect my invention relates, to the admixture of hydrazine [$N_2H_4$] and/or hydrazine compounds, such as Dimethylhydrazine [$(CH_3)_2N_2H_2$] and Unsymmetrical Dimethylhydrazine (i.e. UDMH), to liquid fossil fuels for the reduction of the oxides of nitrogen produced in combustion of liquid fossil fuels such as gasolines and fuel oils, used in internal combustion engines, diesel engines, gas turbines, process furnaces, power plant boilers and other combustion equipment. In another aspect, my invention relates to the injection of hydrazine and/or Hydrazine compounds such as hydrazine hydrate [$N_2H_4.H_2O$], Dimethylhydrazine and UDMH, into the fossil fuels main combustion zone for reduction of the oxides of nitrogen produced in the combustion of solid, liquid and gaseous fossil fuels and subsequently in the discharged combustion effluents from fossil fuels fired combustion apparatus and devices, including but not limited to gas turbines, power plant boilers, process furnaces, fired heaters, steam boilers.

Fossil fuels combustion waste products discharged from various combustion sources into ambient atmosphere have become a major cause of harmful air pollution resulting in serious smog problems. The major health irritants in smog are the oxides of nitrogen (NOx) amongst which nitrogen dioxide ($NO_2$) being extremely poisonous gas presents the most serious problem. Major portion of the NOx discharged into the atmosphere comes from fossil fuels combustion in automotive internal combustion engines, but stationary sources of NOx discharge such as power plants, fired boilers and process furnaces, incinerators and similar combustion equipment are also significant contributors. In these combustion processes thermal NOx is formed as nitric oxide (NO) in the high temperature combustion zone from the nitrogen and oxygen in the combustion air and of the combustion gases. The high temperatures in the combustion zone favour NO formation, the original form in which the oxides of nitrogen are created in the combustion process. This NO is subsequently oxidized to $NO_2$ as soon as the lower temperature required for this are reached in zones of great local air oxygen surplus and upon discharge into ambient air. In addition to the formation of NO, from nitrogen and oxygen available in the combustion air as "thermal NOx", the combustion of fuels containing organically bonded nitrogen will eventually form the so called "fuel NOx".

In prior art there have been considerable and numerous efforts to find an effective method of removing NO and $NO_2$ from combustion effluents by catalytic reduction alone and with the injection of ammonia into the combustion effluents as the reducing agent. The prior art relates to NOx reduction methods constrained to NO reduction in the combustion gases effluent flow downstream of the region of fuel combustion where the effluent gases have cooled down to the lower temperature range required by the catalyst to promote an effective catalytic reaction, without exposing the catalyst to unacceptable thermal degradation damage or destruction. A notable exception to the method of NOx reduction in the combustion effluent stream is the use of demineralized water or steam injection into the fuel combustion zone of stationary gas turbines to supress NO formation in the fuel combustion zone by decreasing the combustion zone flame temperatures.

SUMMARY OF THE INVENTION

Accordingly I claim the object of my invention a method for reduction of oxides of nitrogen formed in fossil fuels combustion by the use of admixture of hydrazine and/or hydrazine compounds to the liquid fossil fuels as the NOx reducing agent in the combustion process of the liquid fossil fuels, or by interjection of hydrazine and/or hydrazine compounds into the fossil fuels combustion zone as the reducing agent for the reduction of oxides of nitrogen formed in the combustion process in advance to the discharge of the combustion products effluents.

The good quality combustion process depends on favourable conditions within the combustion chamber, such as excess of combustion air, air to fuel ratio, effective mixing of the fuel with combustion air, optimal flow in combustion zone for flame stability and proper choice of the air to fuel ratio in the main combustion zone. Main causes of incomplete fuel combustion under correct burning conditions and sufficient air surplus, can be a low reaction temperature or inadequate retention time of the reacting substances in the combustion reaction zone. Higher flame temperatures and longer retention times or reacting substances in the main combustion reaction zone improve the combustion process, however, result in increased NOx formation in the combustion reaction zone. With some simplications, the mechanism of NOx formation within the combustion flame and immediately after it, can be represented by the reaction between the nitrogen and oxygen contained within the high temperature combustion air, forming nitrogen oxides as follows

$N_2 + O_2 \rightarrow$ Nitrogen oxides.

Depending on combustion flame temperature and retention time, this reaction reaches sooner or later a condition of equilibrium, where as much NO is being dissociated to molecular $N_2 + O_2$ as is being formed anew, so that the NO content does not rise measurably any more. The speed with which this equilibrium is reached is first of all dependent on the combustion zone temperature and on the local air to fuel ratio. The NO content at this equilibrium is largely determined by the same two parameters as well.

The object of my invention is a method interjecting a NOx reducing agent into the combustion reaction zone of the fossil fuels combustion process to inhibit the reaction mechanism of NO formation and substantially remove the remaining NO by reduction of NO to molecular $N_2$ in reaction with the NOx reducing agent contacted in the combustion reaction zone. The further object of my invention is a method using hydrazine and/or hydrazine compounds as the NOx reducing agent for the reduction of NO formed in the combustion reaction zone by the fossil fuels combustion process.

The hydrazine and hydrazine compounds when used as rocket propulsion fuels proved to be powerful reducing agent in the combustion reaction process with a variety of oxides of nitrogen used as oxidizer in rocket bipropellant combinations. Hydrazine and several of its compounds employed as rocket fuel propellents are used in combination with a variety of oxides of nitrogen as oxidizers, such as NO, $NO_2$, $N_2O_4$, $HNO_3$, mixed oxides of nitrogen, RFNA(14%NO) and WFNA. Some of the bipropellant combinations are hypergolic (i.e. the fuel and oxidizer burn spontaneously upon contact), these are: UDMH with mixed oxides of nitrogen (24%NO), hydrazine with $N_2O_4$, and hydrazine with RFNA (14%$NO_2$). The hypergolic property of these bipropellant combinations is characteristic of the disposition of large chemical reaction affinity between the fuel and oxidizer in the rapid oxidation-reduction process accompanied by the release of large amount of energy at a correspondingly large reation rate. The consideration of the well proven and powerful properties of hydrazine and hydrazine compounds for the reduction of the various oxides of nitrogen, established the chemical basis for selecting hydrazine and/or hydrazine compounds as the reducing agent admixture to the fossil fuels for the reduction of oxides of nitrogen formed in the combustion reaction zone of the fossil fuels combustion process.

DETAILED DESCRIPTION OF THE INVENTION

The subject of my invention relates to a method for removing the NO formed in the combustion reaction zone gasses as products of the fossil fuels combustion process, said method comprising the step of interjecting sufficient amount of hydrazine and/or hydrazine compounds admixture to the fossil fuels in the combustion reaction zone as the NO reducing agent to inhibit the formation of NO and remove the NO content present in the combustion zone gases in the NOx reduction reaction with hydrazine and/or hydrazine compounds.

In practice of this invention in order to obtain effective removal of NOx including NO from the fossil fuels combustion products it is important that the admixture of hydrazine and/or hydrazine compounds used with the fossil fuels are thoroughly intermixed and dispersed into the combustion air within the combustion reaction zone to facilitate contact between the oxides of nitrogen and hydrazine and/or hydrazine compounds.

Combustion reaction zone in this invention is meant to be that physical volume of fossil fuels combustion reaction space occupied by the combustion flame and the immediatelly flame surrounding space involved in the fuel combustion process.

The amount and rate at which hydrazine and/or hydrazine compounds are needed in the fossil fuels combustion reaction zone for the reduction of NO forming in fossil fuels combustion process is primarily dependent on the rate and amount of NO generated in the combustion process, which in turn depends on the fuel consumption and type of fossil fuel used in the combustion process, as well as the type and design of the fossil fuels fired combustion apparatus or device. Fundementally in the reduction reaction of 2 moles NO react with one mole of Hydrazine $H_2N.NH_2$ to form 2 moles $N_2$ and 2 moles $H_2O$ in the process, or one mole NO reacting with one mole UDMH producing one mole each $N_2$ and $H_2O$. Consequently in a theoretically reduction reaction the ideal amount of hydrazine and/or hydrazine compounds interjected in a perfect mixture with the fossil fuels and combustion air in the combustion reaction zone would range from 0.5 to 1.0 moles per mole of NO formed in the fuel combustion process. However, the perfect mixture conditions in which the total amount NO contained in the mixture comes into contact with the total amount of hydrazine and/or hydrazine compounds in the same mixture at any instant of time in the combustion reaction zone can not be realistically achieved, allowing a fraction of the NO to escape the reduction reaction in the case that only the theoretically ideal amount of Hydrazine and/or Hydrazine compounds, described above, were interjected into the fuel combustion reaction zone. Therefore, in order to assure that all of the NO formed in the fuel combustion process at any given instant of time is completely reduced to $N_2$ and $H_2O$ an excess amount hydrazine and/or hydrazine compounds over and above of the theoretically ideal amount will be interjected into the fuel combustion reaction zone until reduction of all NO is accomplished. It is anticipated that interjection of 100% excess, that is on the average of 2 moles of hydrazine and/or hydrazine compounds into the fuel combustion reaction zone per each mole NO formed in the fuel combustion process will be sufficient for the reduction of all of the NO generatated by most types of fossil fuel fired combustion apparatus and devices.

The hydrazine and/or hydrazine compound reduction reaction of NOx content formed in the fossil fuels combustion reaction zone is carried out at the operating combustion pressures of the respective types of combustion devices, for combustion pressures ranging from about 0.5 atmospheres to 100 atmospheres.

For example in a typical gas turbine combustion process the combustion of 1 kg of diesel fuel produces about 20 g $NO_2$ discharged in the gas turbine combustion effluents which is approximately 0.435 moles of $NO_2$ per kg of diesel fuel combustion, representing about 0.29 moles of NO formed in the combustion of 1 kg of diesel fuel in the gas turbine. Using the average ratio of 2.0 moles of hydrazine for the reduction of 1 mole of NO, the amount of hydrazine to be interjected into the gas turbine combustion reaction zone needed for reduction of all NO formed in combustion of 1 kg of diesel fuel oil equals 0.58 moles or 18.59 g of hydrazine per 1 kg of diesel oil consumed in gas turbine fuel combustion.

In an embodiment of my invention for a stationary gas turbine operating on the combustion of fuel oil or natural gas, the amount of Hydrazine needed for the reduction of the amount of NO formed in the gas turbine combustion reaction zone(s) is injected in water solution as hydrazine hydrate ($N_2H_4.H_2O$) admixture with the gas turbine combustion fuel into said combustion reaction zone(s).

In another embodiment of my invention for gas turbines, internal combostion engines, automotive internal combustion engines, power plant boilers as well as other fossil fuel fired combustion devices operating on combustion of liquid fossil fuels, the amount of Hydrazine needed for the reduction of the amount of NO formed in the combustion process of liquid fossil fuels, is interjected into the combustion reaction zone(s) by the liquid fossil fuel blend containing the admixture of Hydrazine and/or fuel compatible hydrazine compounds such as, Methylhydrazine, Dimethylhydrazine or UDMH, or combinations thereoff.

In yet another embodiment of my invention for fossil fuels fired combustion apparatus operating on the combustion of solid fuels, gaseous fuels as well as liquid fuels, the amount of Hydrazine, needed for the reduction of the amount of NOx formed in the fuel combustion process of said fuels, is interjected into the combustion reaction zones in water or steam solution ($N_2H_4 \cdot H_2O$) where the water or steam propells and mixes the Hydrazine with the fuel and combustion air in the ongoing combustion process in the combustion reaction zone(s).

While the above description contains many specificities, the reader should not construe these as limitations on the scope of the invention, but merely as exemplifications of prefered embodiments thereof. For example skilled artisans will readily be able to change the proportions of the amounts of hydrazine and/or hydrazine compounds interjected into the fossil fuels combustion reaction zone above and beyond the amount needed for the reduction of the total amount of NO being formed in the fuel combustion process which is strongly influenced and dependent on a given fossil fueled combustion apparatus type and design, as well as the type of fuel used. They can make many variations in the method of interjecting hydrazine and/or hydrazine compounds into the combustion reaction zone. In fact they can redesign and make physical changes in combustion devices wherein the hydrazine and/or hydrazine compounds could be interjected into the combustion process by admixture to the combustion air. Accordingly the reader is requested to determine the scope of my invention by the appended claims and their legal equivalents and not by the examples which have been given.

What I claim is:

1. A process for reduction of oxides of nitrogen formed in fossil fuels combustion reaction zone of a fossil fuels combustion apparatus or combustion device, the said oxides of nitrogen reduction process comprising: the step of interjecting an admixture of oxides of nitrogen reducing agents into said fossil fuels combustion reaction zone, said admixture of oxides of nitrogen reducing agents consisting essentially of methylhydrazine, dimethylhydrazine, and unsymmetrical dimethylhydrazine hydrazine compounds intermixed in combination with the combustion fuel and combustion air delivered into said fossil fuels combustion reaction zone said fossil fuels combustion reaction zone containing a mixture of combustion fuel, combustion air, products of combustion, including oxides of nitrogen formed in the fuel combustion reaction and said interjected admixture of oxides of nitrogen reducing agents, whereby said oxides of nitrogen contained in the combustion reaction zone mixture react in the combustion process with said interjected admixture of oxides of nitrogen reducing agents, converting said oxides of nitrogen in chemical reduction process with said interjected admixture of nitrogen oxides reducing agents, to harmless molecular $N_2$ and $H_2O$, which is discharged in the effluent of combustion products to the ambient atmosphere.

* * * * *